Aug. 10, 1948. J. H. SEGUIN 2,446,725
ADJUSTABLE NOSE BRIDGE SUPPORT
FOR BIFOCAL SPECTACLES
Filed Dec. 3, 1945
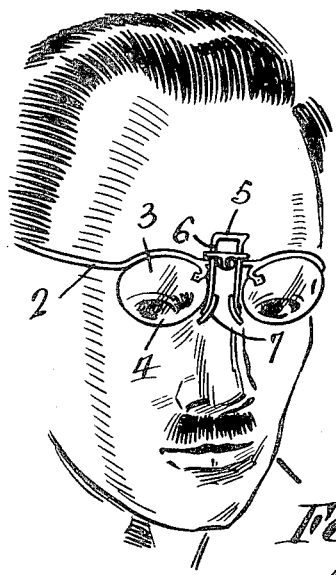
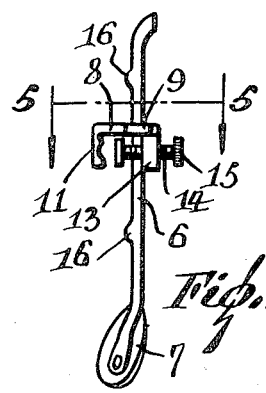
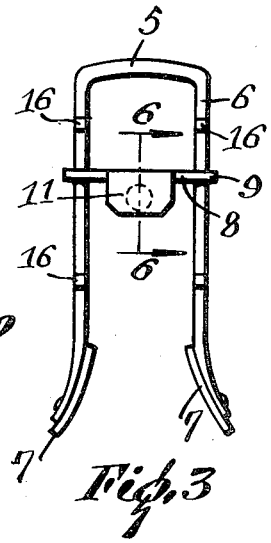
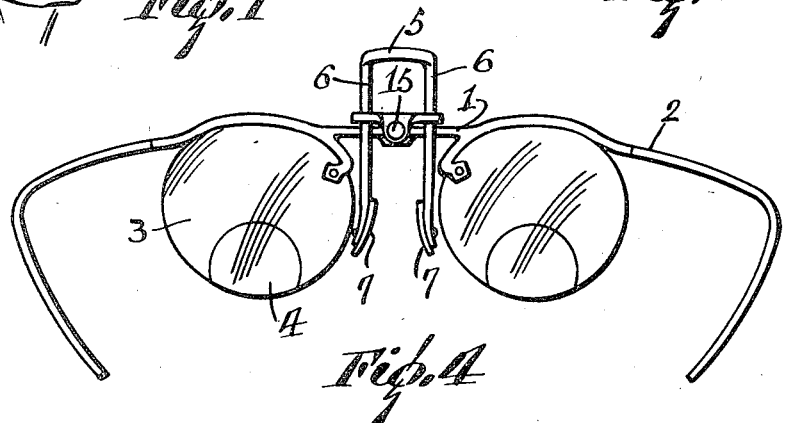
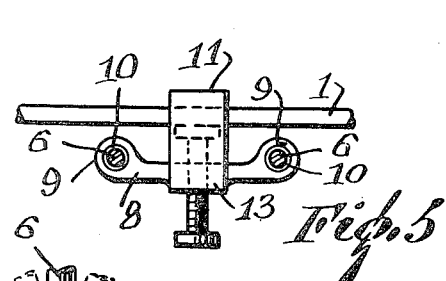
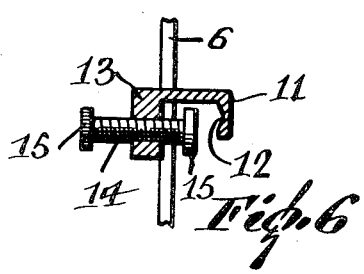
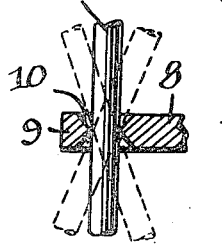
Inventor:
Jean Hughes Seguin
By *[signature]*
Attorney Patented Aug. 10, 1948

2,446,725

UNITED STATES PATENT OFFICE 2,446,725

ADJUSTABLE NOSE BRIDGE SUPPORT FOR BIFOCAL SPECTACLES

Jean Hughes Seguin, St. Eustache, Quebec, Canada

Application December 3, 1945, Serial No. 632,398

2 Claims. (Cl. 88—51)

The present invention pertains to a novel support for spectacles, particularly of the bifocal type. It is well known among wearers of bifocal spectacles that considerable difficulty is experienced in shifting the line of sight from the distance portion of the lens to the reading portion and vice versa. For example, the wearer must tilt his head to an uncomfortable angle in order to sight through the reading or inserted lens portions.

The principal object of this invention is to overcome these difficulties and is accomplished primarily by the use of an independent nose bridge on which the ophthalmic mounting is adjusted. The bridge is a separate inverted U-shaped member adapted to rest on the nose and carries a vertically adjustable slide. The ophthalmic mounting has no nose bridge but includes a cross piece between the spaced lenses. The slide is formed with a clamp for receiving the cross piece, and the vertical adjustment of the slide places the desired portion of the lenses in the line of sight of the wearer. The slide is so constructed that it maintains its adjusted position frictionally on the sides of the nose bridge. Moreover, the slide, carrying the ophthalmic mounting is adjustable angularly with respect to the sides of the bridge in order to alter the plane of the lenses if desired by the wearer.

The additional support provided by the temples of the mounting cooperates with the adjustable slide in maintaining the mounting in the selected adjusted position.

The invention is fully disclosed by way of example in the following description and in the accompanying drawings in which:

Figure 1 is a perspective view showing the spectacles as worn;

Figure 2 is a side elevation of the bridge and adjustable member thereon;

Figure 3 is a corresponding rear elevation;

Figure 4 is a front elevation of the assembly;

Figure 5 is a plan section on the line 5—5 of Figure 2;

Figure 6 is a vertical section on the line 6—6 of Figure 3, and

Figure 7 is a detail vertical section of the adjustable member at one of the sides of the bridge.

Reference to these views will now be made by use of like characters which are employed to designate corresponding parts throughout.

In Figure 4 is shown a pair of bifocal lenses joined to an ophthalmic mounting 1 having a pair of hinged branches 2 but no integral nose piece or bridge. Each lens comprises a main lens section 3 or distance lens in which is fitted a smaller insert or reading lens 4.

The bridge 5 is a separate inverted U-shaped member having vertical sides 6 adapted to lie between the lenses. The lower ends of the sides 6 carry pads 7 to rest on the nose of the wearer as shown in Figure 1.

A supporting member 8 is slidably mounted on the sides 6 and, for this purpose, is formed at its ends with apertured ears 9 receiving the sides 6. The apertures 10 in the ears 9 are enlarged at both top and bottom as shown in Figure 7, to permit the angular adjustment shown in dotted lines.

At the rear edge of the slide 8 is formed a downward flange 11 as shown in Figure 2. The flange has a forwardly facing horizontal groove 12 adapted to receive the intermediate portion of the mount 1.

At the forward edge of the slide 8 is provided a depending nut 13 receiving a set screw 14 having heads 15 at both ends or at both sides of the nut.

In the use of the device, the support for the lenses on the head of the wearer is derived from the bridge 5 and the temples 2. The intermediate portion of the mount 1 is held in the groove 12 by the adjacent head 15 of the set screw 14. The slide 8 is movable between spaced stops 16 formed on the sides 6.

The wearer adjusts the elevation of the lenses by placing his forefinger upon the bridge 5 and moving the slide 8 with his thumb, or in some similar fashion. In this manner he brings the reading lens in level with the eyes. If an angular adjustment of the bridge 8 is needed one end of the slide is pulled as permitted by the enlarged apertures 10 shown in Figure 7. To return the main lens to level of the eyes, fingers are inserted between bridge 5 and slide 8. There is sufficient friction between the walls of the apertures and the sides 6 to maintain the slide 8 in the adjusted position. The sliding movement is limited by the stops 16 on the upper and lower parts of sides 6.

Although a specific embodiment of the invention has been illustrated and described, it will be understood that various alterations in the details of construction may be made without departing from the scope of the invention as indicated by the appended claims.

What I claim as my invention is:

1. A support for spectacles comprising an inverted U-shaped nose bridge, a slide having apertured ends slidably receiving the sides of said bridge, and a clamp carried by said slide between the sides of said bridge and adapted to be attached to the cross piece of an ophthalmic mounting, each of the apertures of said ends being enlarged at both top and bottom to permit angular adjustment of said sides in said apertures.

2. A support for spectacles comprising an inverted U-shaped nose bridge, a slide having apertured ends slidably receiving the sides of said bridge, a flange on said slide and having a groove adapted to receive the cross piece of an ophthalmic mounting, another flange on said slide opposite the first flange, and a set screw threaded in the second flange and movable toward the first flange.

JEAN HUGHES SEGUIN.

REFERENCES CITED

The following references are of record in the file of this patent:

UNITED STATES PATENTS

| Number | Name | Date |
|---|---|---|
| 2,252,922 | Goldstein | Aug. 19, 1941 |

FOREIGN PATENTS

| Number | Country | Date |
|---|---|---|
| 359,536 | Germany | Sept. 23, 1922 |
| 380,725 | Great Britain | Sept. 22, 1932 |